Patented Mar. 18, 1952

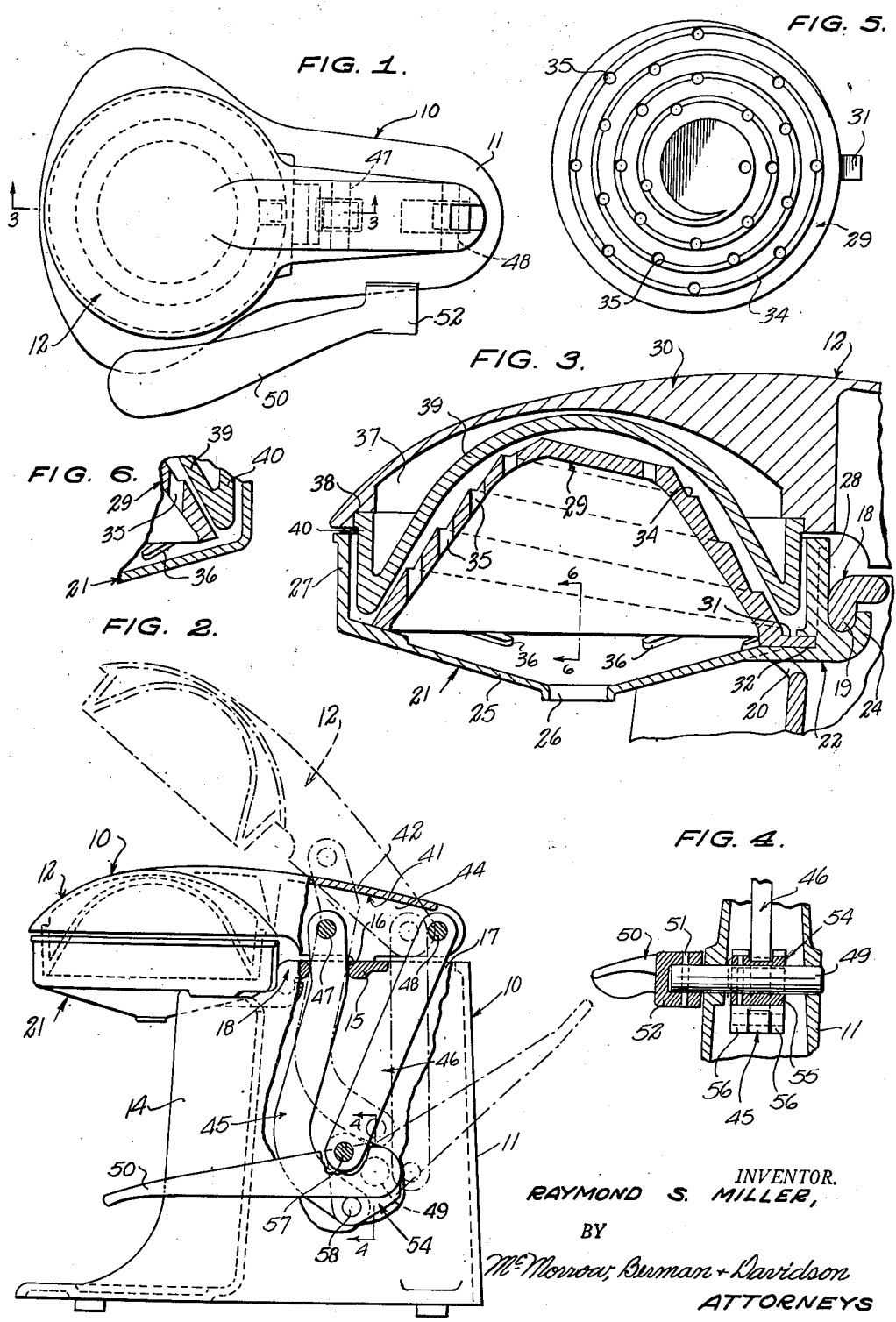

2,589,724

UNITED STATES PATENT OFFICE 2,589,724

FRUIT PRESS

Raymond S. Miller, Hollywood, Calif.

Application February 1, 1949, Serial No. 73,928

1 Claim. (Cl. 100—45)

This invention relates to an improved fruit press particularly for extracting juice from citrus fruit.

A primary object of the invention is to provide an improved fruit juice extractor press having improved lever actuation of the press head, whereby the press head has a straight line, high power closing motion for pressing the fruit, and a rapidly opening motion.

Another object of this invention is to provide a fruit juice extractor press of this kind having a maximum of pressing force with a minimum of lever movement and operating effort.

Still another object of this invention is to provide an actuating linkage for the movable head of a fruit press whereby the head engages with the fruit in a coplanar and substantially linear movement for extracting the juice and moves upwardly to an inclined position wherein the pressed fruit is exposed for removal.

With the above and other objects in view, my invention consists in the arrangement, combination and the details of construction disclosed in the drawings and specification, and then more particularly pointed out in the appended claim.

In the drawings:

Figure 1 is a top plan view of a fruit press constructed according to an embodiment of my invention, Figure 2 is a side elevation partly broken away, and partly in section, Figure 3 is an enlarged vertical longitudinal fragmentary detailed section taken on the line 3—3 of Figure 1, Figure 4 is a fragmentary transverse vertical section taken on the line 4—4 of Figure 2, Figure 5 is a top plan view of the fruit supporting conical member removed from the assembly, and Figure 6 is a fragmentary transverse vertical detailed section taken on the line 6—6 of Figure 3.

Referring to the drawings the numeral 10 designates generally the illustrated fruit press which comprises a hollow housing or base 11 and a rockable press head 12. The base 11 is formed of a substantially vertical cylindrical body having a forwardly concaved forward wall 14. The upper end of the cylindrical base 11 is provided with a top wall 15 rearwardly of the forward wall 14, the top wall 15 being formed with a forward opening 16 and a rearward opening 17, for purposes described hereinafter. The forward edge of the top wall 15 is provided with a hook 18 having a downwardly directed bill portion 19. The concave forward wall 14 of the housing 11 is formed with an opening 20 at the upper end thereof forwardly of and below the hook 18.

A circular funnel-shaped member 21 is supported on the upper edge of the forward wall 14 forwardly of the hook 18. The funnel 21 is provided with an upwardly directed hook 22 on the rear edge thereof having an upwardly directed bill 24 for engagement behind the downwardly directed bill 19 of the hook 18 carried by the upper wall of the housing 11. With the hook 22 engaged with the hook 18 the bottom surface of the funnel 21 rests upon the upper edge of the forward concave wall 14 whereby the funnel 21 is supported thereon.

The funnel 21 has a bottom wall 25, which is formed in the manner of a downwardly converging cone having an opening 26 at the center and apex thereof. A cylindrical side wall 27 is formed on the outer edge of the bottom wall 25 and extends upwardly therefrom. The side wall 27 is provided with a reinforcing rib as 28 immediately above the hook 22 formed as an outward extension of the bottom wall 25.

A fruit supporting cone 29 is supported within the funnel 21. The cone 29 is hollow and seats removably on the bottom wall 25 of the funnel 21. The peripheral or outer edges of the cone 29 are disposed closely adjacent to the cylindrical wall 27 of the funnel 21. A lug 31 is formed integrally with a portion of the lower edge of the conical member 29 and is arranged to engage in a recess 32 formed in the funnel 21 in the forward side of the hook 22. The engagement of the lug 31 in the recess 32 secures the cone 29 removably in place in the funnel 21 against accidental displacement.

The conical fruit supporting member 29 is formed with a spiral groove 34 in its upper surface, which winds downwardly from the top of the cone to the larger lower end thereof. A plurality of holes 35 are formed through the conical member 29 and extend downwardly from points along the groove 34. The groove 34 and the holes 35 are provided for draining juices from the fruit pressed on the conical member 29. A plurality of radially inwardly extending supporting ears 36 are formed integrally with the bottom wall 25 of the funnel 21. The ears 36 are arranged to engage the lower edge of the conical member 29 and support the member 29 in upwardly spaced relation to the bottom wall 25. The spacing of the lower edge of the conical member 29 above the surface of the bottom wall 25 provides for the free drainage of juices from the groove 34 downwardly through the opening 26 in the bottom wall 25 of the funnel 21.

The press head 12 comprises a generally circular portion 30 which is formed with a downwardly opening concave recess 37 whose side wall has a rabbeted lower edge 38. An inverted concave cup member 39 is carried by the head portion 30 for engagement over the conical member 29 within the side wall 27 for pressing a piece of fruit thereon to extract the juice therefrom. An upwardly extending cylindrical side wall 40 is formed on the lower end of the cup member 39. The upper edge of the cylindrical wall 40 of the cup member 39 is frictionally engaged in the rabbeted edge 38 of the head portion 30 for securing the cup 39 thereon.

The press head 12 further comprises a hollow lower arm 41 formed integrally with the head portion 30, to which the actuating linkage is attached. The lower arm 41 is formed with a top wall 42 integral with the portion 30 and extending rearwardly therefrom. Side walls 44 extend downwardly from the top wall 42 providing a downwardly opening lever arm.

Front and rear downwardly extending links 45 and 46, respectively, are pivotally connected at their upper ends to the lever arm 41 and extend downwardly through the front and rear openings 16 and 17 respectively in the top wall 15 of the housing or base 11. The upper end of the forward link 45 is pivotally connected to the lever arm 41 by a pivot pin 47 engaging through the side walls 44. A pivot pin 48, extending through the side walls 44, at the rear end of the lever arm 41, pivotally connects the upper end of the rear link 46 to the lever arm 41, rearwardly of the forward link 45.

A transverse longitudinal shaft 49 extends between and is journaled to the side walls of the housing 11, and a hand lever 50 is fixed on one end of the shaft 49, by a pin 51 engaging through the hub 52 of the lever 50 and the end of the shaft 49 extending outwardly at one side of the housing 11. A lever, as 54, is fixedly secured on the shaft 49 between the side walls of the base 11. The lever 54 includes a hub portion 55 fixedly secured on the shaft 49 having a pair of laterally spaced triangular plates 56 formed integral with the hub portion 55 and extending forwardly from the shaft 49 in the normal lowered position of the press head 12. The lower end of the rear link 46 is positioned between and pivotally connected to the plates 56 of the lever 54, by a pivot pin 57. With the actuating lever 50 in its substantially horizontal forwardly directed position the pivot pin 57 will be disposed above a horizontal plane through the shaft 49. A pin 58 pivotally connects the lower end of the forward link 45 to the lever 54 below the pivot pin 57, substantially below the horizontal plane described above. In the horizontal position of the actuating lever 50 the pivot pin 58 will be disposed vertically below the pivot pin 57. To provide clearance between the actuating links 45 and 46, the lower end of the link 45 is bent downwardly and rearwardly so that the links will be free from each other in all positions of the cap actuating lever 54.

In the use and operation of this fruit press 10 the lower jaw member 21 is initially engaged in the supporting member 11, by engaging the bill 24 of the hook 22 behind the bill 19 of the hook 18 fixed on the supporting member 11. The lower surface of the lower jaw member 21 or funnel will be supported on the upper edge of the forwardly extending walls 14. The conical member 29 may then be engaged in the jaw member 21 by engaging the tab 31 into the recess 32. For separating the jaw members 21 and 30 the actuating handle or lever 50 is moved rearwardly to the dotted line position shown in Figure 2 of the drawings. In this position of the shaft 49, fixed on the lever 50, the pivot pin 57 for the rear link 46 will be moved to a position rearwardly of the axis of the shaft 49. The pivot pin 58 will then be disposed vertically above the shaft 49 in the dotted line position shown in Figure 2. With the fruit to be pressed engaged on the conical member 29 in the lower jaw member 21, the lever 50 may be then moved forwardly for extracting the juice from the fruit. Forward movement of the lever 50 will actuate the lever 54 for moving the pivot pin 58 of the forward link 45 downwardly in a substantially vertical line to the full line position shown in Figure 2. The pivot pin 57 connecting the rear link 46 to the pivot 54 will be moved in a forward position to the full line position shown in Figure 2. As the forward link 45 is moved in a substantially vertical line, the forward pivot pin 47 will be moved in the same direction, so that the arm 41 will be substantially pivoted about the pivot pin 48, which connects the upper end of the rear link 46 between the lever 41 and the lever 54. As the pivot pin 57 moves in a substantially horizontal line, there will be very little vertical movement of the rear end of the lever 41, and the rear pivot pin 48. As the movement of the forward link 45 is substantially all in a vertical line, the pivot pin 47 and the forward end of the lever 41 will be moved in a substantially vertical line, thereby pivoting the cap 12 about the rearmost pivot pin 48. In this manner a fruit supported on the lower jaw member 21 will be pressed by engagement of the upper jaw member 30. It will be noted that when the pin 57 has been moved to its forwardmost position, as noted in full lines in Figure 2 of the drawings, the movement of the head 12, and upper jaw member 30 will be substantially downwardly, in a horizontal plane. This horizontal plane will be substantially the same plane as the lower jaw member 21, and the fruit supported on the fruit engaging member 29.

The movement of the upper jaw member, and cap 12, may be described, starting from the full line position shown in Figure 2, as moving upwardly in a substantially horizontal plane for a short distance until the pivot pin 58 is moved forwardly of the position of the pivot pin 57. At this time the planar movement of the cap 12 upwardly is changed to a swinging movement about the pin 48. At this time the pin 57 has substantially finished its vertical movement and is starting its horizontal movement, and all movement of the pin 58 is vertical. As the pin 58, and link 45 move upwardly, the forward end of the upper jaw member 30 will be moved upwardly about the rear pivot pin 48. The forward movement of the handle or lever 50 results in exactly the reverse movement described above, that is the upper jaw member 30 is pivoted initially about the pivot pin 48 until the cap 12 has reached a substantially horizontal position, whereupon further movement of the lever 50 downwardly results in the movement of the upper jaw member 30 downwardly in a horizontal plane, for engagement with the lower clamping jaw member 21.

I do not mean to confine myself to the exact details of construction herein disclosed, but claim all variations falling within the purview of the appended claim.

What I claim is:

In a fruit press, a base, a vertical funnel mounted on and projecting laterally outwardly from the base, said funnel having a bottom wall, a perforated fruit supporting cone supportably resting upon said funnel, a press head comprising a circular portion having a cup member on its under side for engagement over said cone to press fruit on said cone with the press head in its depressed horizontal position, said press head further comprising a lever arm on said circular portion projecting over the top of said base, a first vertical link pivoted at its upper end to said lever arm and depending therefrom, a second vertical link pivoted at its upper end to said lever arm at a point at the side of said first link remote from said circular portion of the press head, said second link depending from said lever arm, a horizontal shaft extending transversely across the base and journaled thereon, lever means fixed on said shaft, said first and second links being pivoted at their lower ends to said lever means at points circumferentially spaced with respect to said shaft, and a hand lever fixed on said shaft for rotating said shaft in one direction to swing said press head upwardly away from its depressed position and in the opposite direction to swing said press head downwardly from its elevated position to its depressed position.

RAYMOND S. MILLER.

REFERENCES CITED

The following references are of record in the file of this patent:

UNITED STATES PATENTS

| Number | Name | Date |
| --- | --- | --- |
| D. 140,451 | Shaftel | Feb. 27, 1945 |
| 172,505 | Sammis | Jan. 18, 1876 |
| 413,725 | Levy | Oct. 29, 1889 |
| 703,517 | Baumgarten | July 1, 1902 |
| 1,752,272 | Kandel | Mar. 25, 1930 |
| 1,791,821 | Locke | Feb. 10, 1931 |
| 1,958,570 | Flegel | May 15, 1934 |
| 2,018,932 | Thorne | Oct. 29, 1935 |